United States Patent
Cheek

[15] 3,670,870
[45] June 20, 1972

[54] CONVEYOR BELT STRUCTURE

[72] Inventor: Edward E. Cheek, Cleveland Heights, Ohio

[73] Assignee: McDowell-Wellman Engineering Company, Cleveland, Ohio

[22] Filed: March 15, 1971

[21] Appl. No.: 124,032

[52] U.S. Cl..............................198/193, 198/36
[51] Int. Cl......................................B65g 15/30, B65g 65/28
[58] Field of Search....................198/174, 184, 193, 36, 192, 198/199

[56] References Cited

UNITED STATES PATENTS 1,465,071  8/1923  Baker................................198/193 X

*Primary Examiner*—Edward A. Sroka
*Attorney*—McNenny, Farrington, Pearne & Gordon

[57] ABSTRACT

There is provided an endless belt for use in an apparatus capable of performing the operations of stacking and reclaiming bulk material and characterized by a wire cable-reinforced rubber belt having upstanding rigid flights anchored thereto in a manner to utilize the wire cable as a supporting and securing member for the flights. The belts may be either troughed or flat. Lateral stabilizing means may desirably be associated with the flights.

9 Claims, 13 Drawing Figures

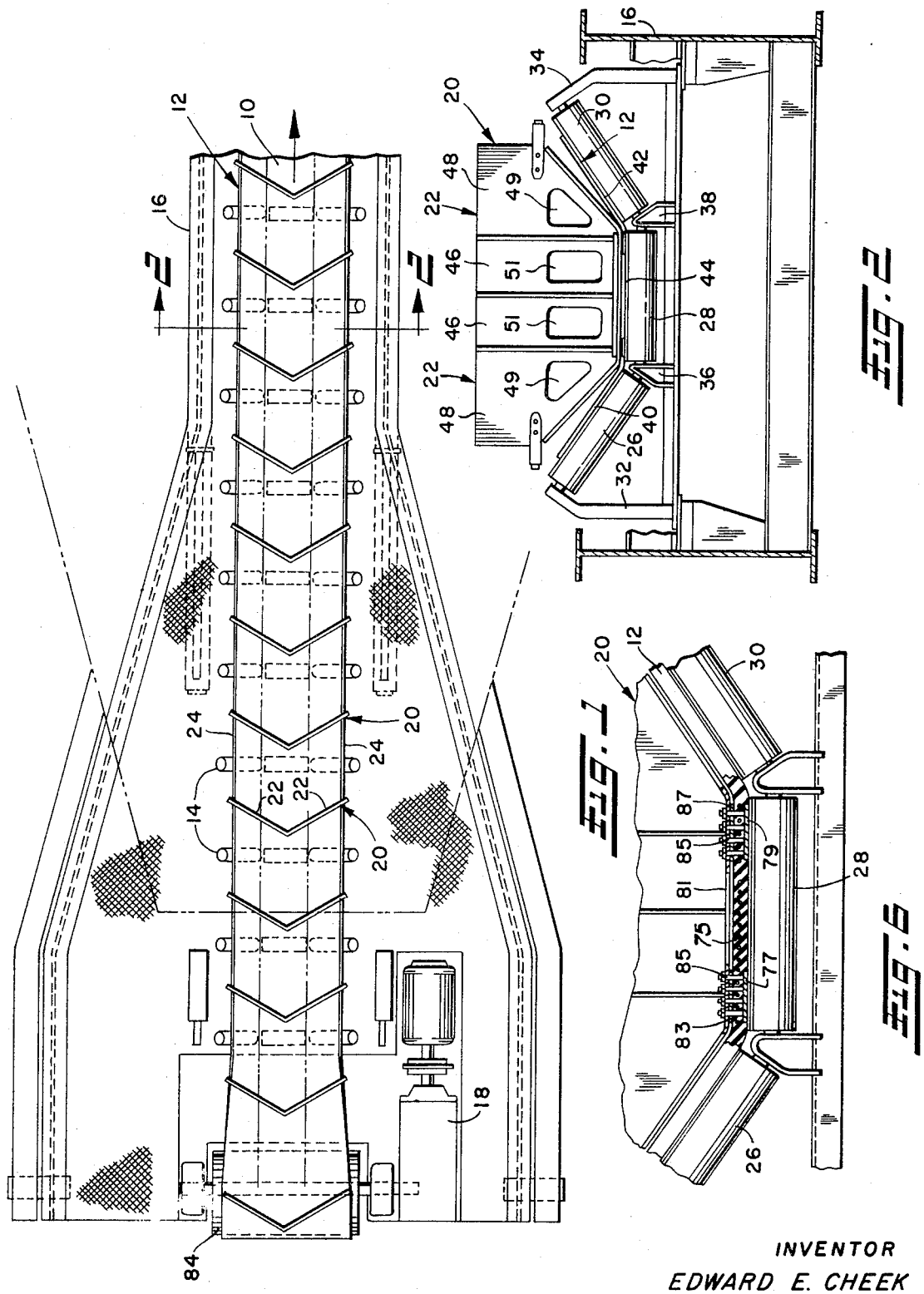

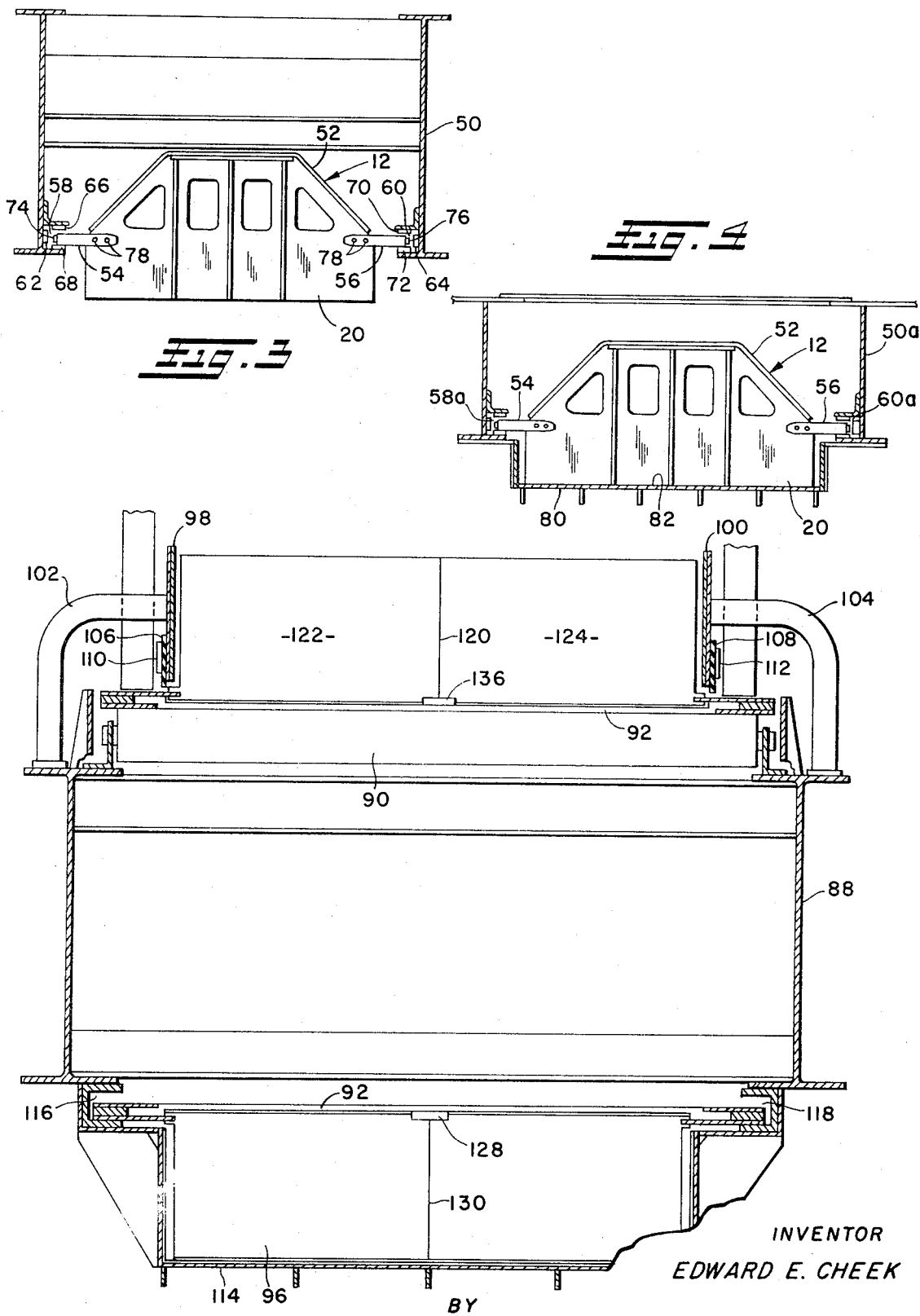

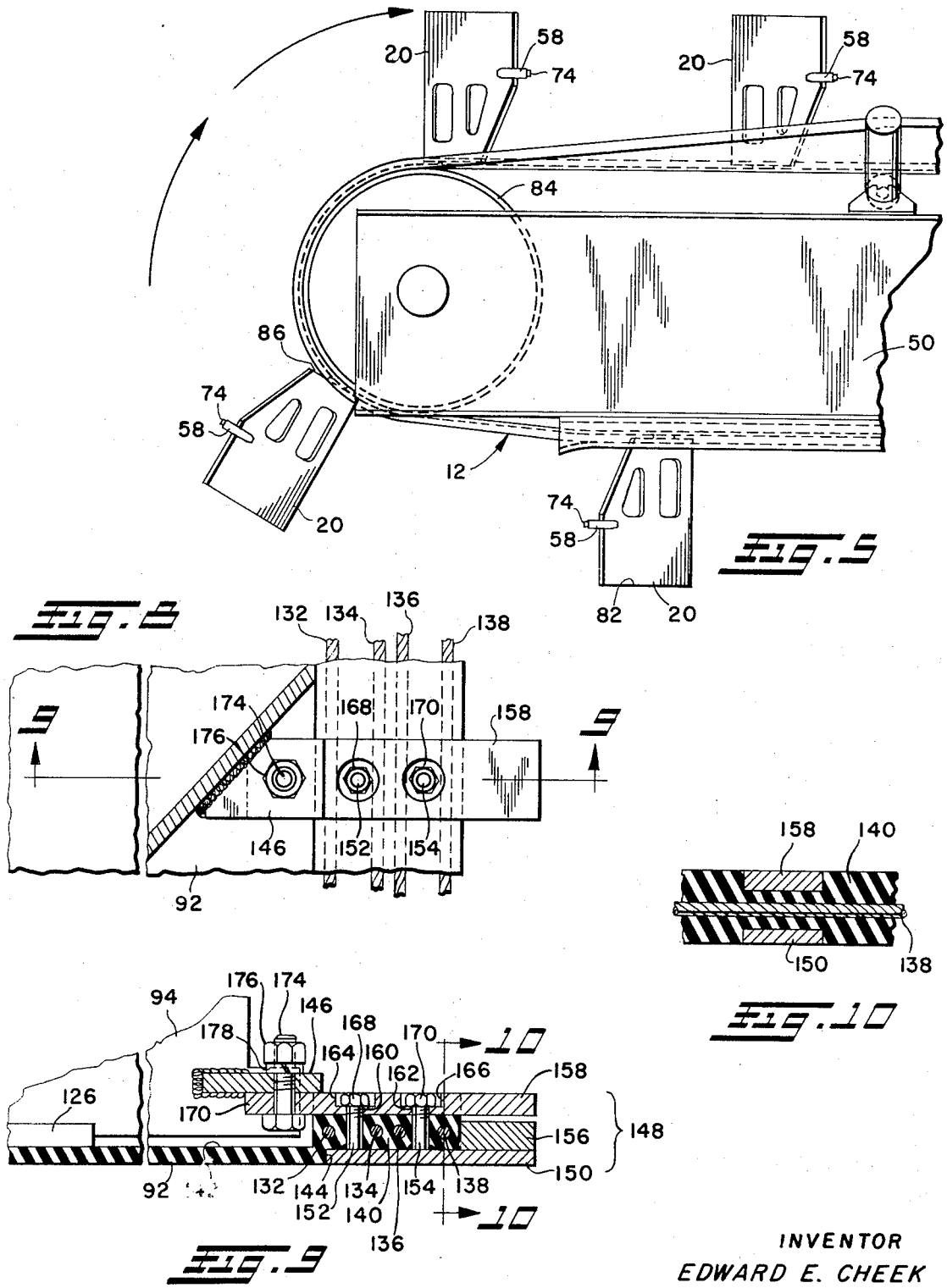

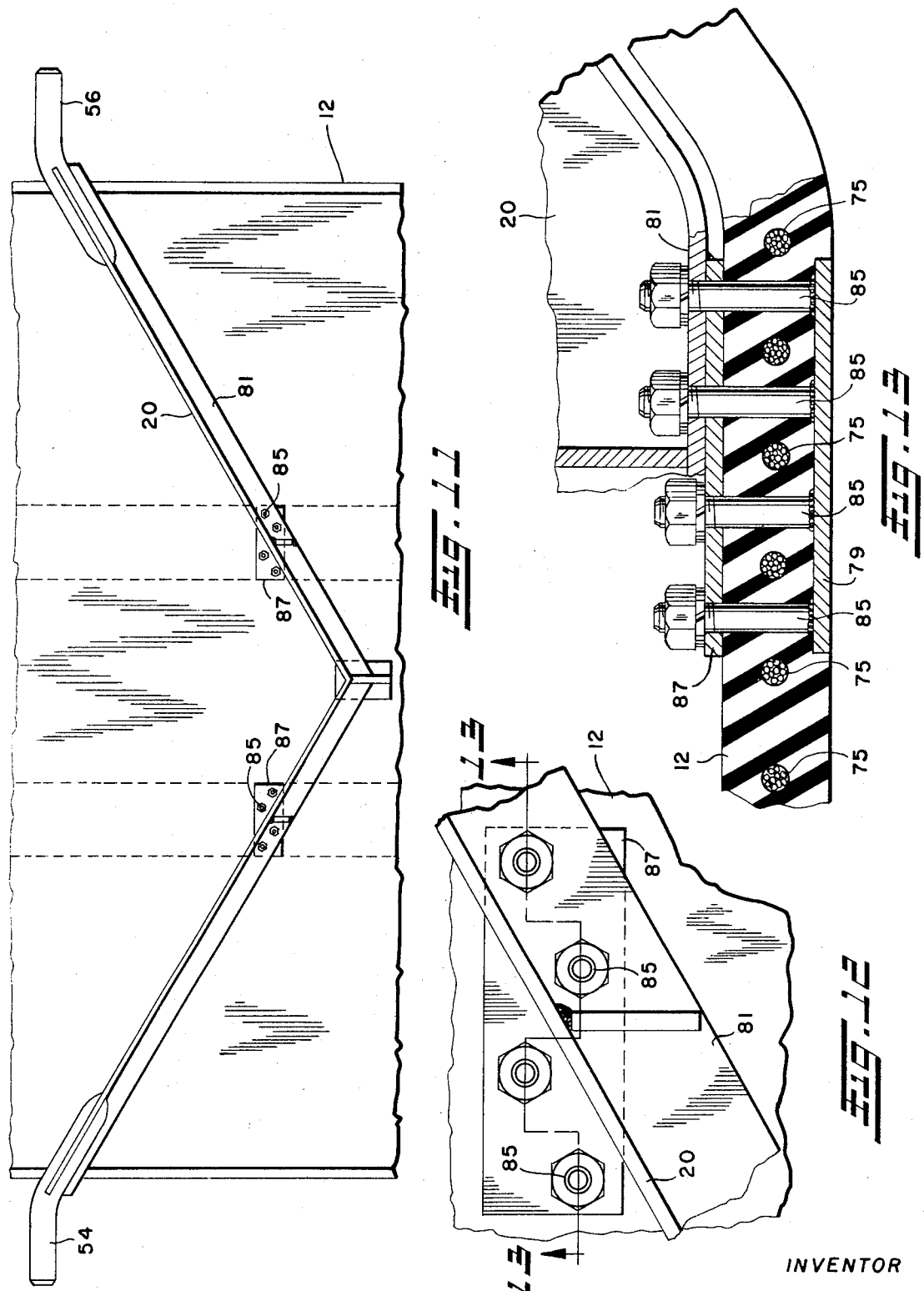

CONVEYOR BELT STRUCTURE

BACKGROUND OF INVENTION AND PRIOR ART

Apparatus designed to perform both the operations of stacking bulk material into storage piles, and reclaiming such material from such piles, is relatively new. Heretofore, separate pieces of equipment have been required. Principal among the reasons dictating separate pieces of equipment is the difficulty encountered in designing a stacker, the lowest point of which is normally above ground level, to be also equipped to elevate reclaimed bulk material from ground level to a ground-supported conveyor belt for removal of reclaimed material. While there is little problem in designing a single-operation device, the requirements of the apparatus for the respective operations are different, and impose, therefore, different design criteria. A reclaimer uses open-bottom flights or rakes moving along the underside of a boom to a point as close to ground level as possible (to minimize the amount of un-reclaimable material, or labor to move it into position for reclaim) followed by a short elevating portion along a chute to move material up a ramp to a removal belt conveyor. Stacking, on the other hand, utilizes a conveyor belt moving along the upper side of a boom to a discharge point at the outer, usually elevated end of the boom. Loading of the stacker is done in the apparatus at about the same location as discharging is done in a reclaimer. No reverse elevating portion is required in a stacker as it is in a reclaimer. Efforts to use a reclaimer so equipped as a stacker by adding a conveyor belt underlying the raking equipment and following the same course as the reclaiming rakes encounter difficulty at the reverse bend along the upper side of the boom at the elevating portion used for reclaiming. Material being stacked and loaded onto the upper reach of such an underlying belt (relative to the return course of the raking apparatus) cannot undergo such a reverse bend without spilling, or utilization of special handling equipment.

As an aid in obviating these difficulties, there is provided a novel type of endless stacker-reclaimer belt adaptable for use also with an articulated five-link boom having several bends in it.

Still further, it is desirable to provide, as an aid in the stacking operation, means for holding bulk material on the conveyor belt to increase the capacity of the conveyor as well as enable elevation of the discharge end higher than the angle of repose of the material on a moving belt would otherwise allow. Embodiments of the present invention achieve this desired objective.

BRIEF STATEMENT OF THE INVENTION

Briefly stated, the present invention is in the provision of an endless stacker-reclaimer belt. The belt comprises an endless fabric-reinforced rubber belt having a plurality of transversely spaced longitudinally extending wire ropes embedded therein. A plurality of upstanding generally cup-shaped or V-shaped rigid flights are disposed at intervals along the belt and are clamped to the belt by clamps which coact at laterally spaced points between each of the flights and correspondingly spaced wire ropes in the belt to secure the flights to the belt. In more specific embodiments, the flights are provided with laterally projecting stabilizing means adapted to coact with stabilizing means to prevent lateral displacement of the stacker-reclaimer belt when submitted to transverse forces during certain reclaiming operations.

BRIEF DESCRIPTION OF THE DRAWINGS

In the annexed drawings:

FIG. 1 is a partial plan view of a stacker-reclaimer apparatus including a boom and an endless stacker-reclaimer belt (partially shown) of the present invention.

FIG. 2 is a cross-sectional view through the boom of FIG. 1 showing a typical flight mounted on a reinforced rubber belt and guided by troughing rollers.

FIG. 3 is a cross-sectional view through a return portion of the boom apparatus of FIG. 1 (otherwise not shown) showing the laterally projecting wear and guide bars and their manner of coaction with recesses carried by the boom to restrict lateral movement of the belt and flight assembly during a reclaiming operation.

FIG. 4 is another cross-sectional view through a return portion of the boom apparatus showing the manner of coaction of the top marginal edge of a flight with a reclaiming chute carried by the boom.

FIG. 5 is a partial side elevation of the tail pulley portion of a boom and showing the coursing of flights about the tail pulley.

FIG. 6 shows a clamp for holding the flight to a troughing belt.

FIG. 7 shows another form of flight for a nontroughing belt in a stacker-reclaimer apparatus utilizing marginal skirtboards along the upper reach of the belt as a means for confining bulk material, and also showing lateral stabilizing along the lower reach of the belt.

FIG. 8 is a fragmentary plan view of a portion of the belt showing marginal reinforcing wire cables and a flight clamp for a flight of the type shown in FIG. 7.

FIG. 9 is a cross-sectional view of the clamp and wear bar portion shown in FIG. 8 as it appears in the plane indicated by the line 9—9 in FIG. 8.

FIG. 10 is a cross-sectional view through the clamp as it appears in the plane indicated by the line 10—10 in FIG. 9.

FIG. 11 is a fragmentary plan view on an enlarged scale of the belt showing a troughing-type flight mounting.

FIG. 12 is a fragmentary view on an enlarged scale of a single clamping station for a troughing-type of flight.

FIG. 13 is a cross-sectional view of the clamping structure of FIG. 12 as it appears in the broken plane 13—13 of FIG. 12.

DETAILED DESCRIPTION OF THE DRAWINGS

Referring now more particularly to FIGS. 1 to 6 inclusive, FIG. 1 shows a portion of the upper reach 10 of an endless stacker-reclaimer belt, generally indicated at 12, and in accordance with the present invention. The endless belt 12 is supported by troughing rollers 14 at spaced intervals along a supporting framework of a boom 16 in a manner known for belt conveyors. The framework 16 and driving means 18 for the belt 12 form no part of the present invention other than to set an environment of an apparatus which is capable of performing both the functions of stacking bulk material and reclaiming bulk material. The present invention is in the modified endless belt per se.

At spaced intervals along the belt 12, there are provided a plurality of flights 20 which are secured to the belt 12 by means hereinafter more particularly described. The flights 20 are of a generally cup-shaped or V-shaped configuration with upstanding side panels 22 diverging forwardly in the direction of motion of the belt 12 (indicated by the arrow in FIG. 1) and outwardly toward the marginal edges 24 of the belt 12.

FIG. 2 is a section taken through the boom 16 as it appears in the plane indicated by the line 2—2 in FIG. 1. In the embodiment shown in FIGS. 1–6, the upper reach 10 of the belt 12 is carried on troughing rollers 26, 28 and 30. These are conventionally mounted on brackets such as brackets 32, 34, 36 and 38. The roller stations such as that illustrated in FIG. 2 are disposed at intervals along the boom 16, the supporting brackets being mounted on the framework 16. Troughing rollers 26, 28 and 30 cause the wide portions 40 and 42 of the belt 12 to be elevated out of the normal plane of the belt and in diverging relation to the central portion 44.

The flight 20 as shown in FIG. 2 is, as indicated above, secured to the belt 12, and is configured along the edges confronting the belt to accommodate the troughing thereof. Thus, each flight 20 is composed of a pair of angularly disposed upstanding plates or side panels 22, each including a rectangular portion 46 and an irregular trapezoidally shaped portion 48.

The upper marginal edges of the respective portions 46 and 48 of the panels 22 desirably lie in the same plane, which plane is horizontally disposed when the belt is in position in a stacker-reclaimer apparatus. As shown in FIG. 2, the flights 20 are provided with openings 49 and 51 to reduce the weight of the flights.

The belt 12 is a commercially available nylon or polyester fabric-reinforced endless rubber belt having a plurality of longitudinally extending wire cables or ropes 75 embedded therein at laterally spaced intervals and symmetrically disposed with respect to the longitudinal center line of the belt. In one embodiment the marginal edge portions each include four cables 132, 134, 136, and 138 as shown in FIG. 8. The inner portions may also include symmetrically disposed wire ropes 75 (FIG. 13) preferably adjacent the region which undergoes flexure in troughing but located in the central portion which is not displaced upon troughing out of the normal running plane of the belt. It is with the aid of these cables that the flights 20 are secured to a belt intended to undergo troughing as hereinafter more particularly described.

FIGS. 3 and 4 show the flight and belt assembly in a position on the underside of a boom in operative position for reclaiming. Thus, there is shown in FIG. 3 a boom structure 50 carrying a flight 20 secured to the lower reach 52 of the belt 12. Rollers other than marginal guide rollers need not be provided along the lower reach, and the cross-sectional contour of the lower reach 52 of the belt 12 is determined by the belt-confronting profile of the flights 20.

In a reclaiming operation, it is not uncommon practice that reclamation shall be from an elongated pile of bulk material or an annular pile. A stacking and reclaiming apparatus in which the belts of the present invention find particular utility may be mounted on wheeled trucks for movement along one face of such piles of bulk material, either on a straight line trackway, or around a circular trackway. In reclaiming, the belt having the flights secured thereto is lowered with the boom and moved downwardly into contact with the confronting face of the pile of bulk material. Simultaneously with the movement downwardly along the face of the pile, the entire apparatus may be and usually is traversed laterally along the face. Hence, the resultant movement of the individual flights is both downward and laterally along the face of the pile of bulk material. Such movement imposes lateral stresses on the belt and, to the end of providing means for reacting against such lateral stresses and suppressing lateral movement of the belt relative to the boom, the flights are provided with laterally extending projecting wear bars, e.g. bars 54 and 56. The wear bars 54 and 56 are adapted to run in grooves 58 and 60, respectively, along the lower marginal edges of the boom structure 50. Recesses 58 and 60 are conveniently provided with thrust pads 62 and 64 extending along the bottoms of the recesses 58 and 60. Skid pads 66 and 68 line the opposing upstanding walls of the recess 58. In like manner skid pads 70 and 72 line the upstanding walls of the recess 60. The wear bars 54 and 56 may conveniently be provided with wear-resistant tips 74 and 76, respectively. These are adapted to coact with the thrust pads 62 and 64, respectively, and lubricating means may be conveniently provided to reduce wear. Any suitable means such as bolts 78 for securing the wear bars 54 and 56 to the flight 20 may be used.

In FIG. 4 the flight 20 is shown at a position in a reclaiming chute 80, the marginal edge 82 of the flight 20 coacting with the bottom of the chute 80 to drag reclaimed material generally upwardly along the chute 80 to a discharge extremity thereof which is positioned above a conveyor belt for movement of bulk material away from the apparatus. The chute structure 80 forms no part of the present invention but again provides an environment in which the endless belt structure hereof is most useful.

FIG. 5 shows an end of the boom 50 wherein the endless belt 12 reverses direction about a tail pulley 84. The belt 12 undergoes a transition from the trough-like profile in the working regions of the belt to a flat profile as it courses around the tail pulley 84. The leading edge 86 of the flight 20 as the belt reverses direction about a pulley, such as tail pulley 84, moves away from the belt surface. Since the flight 20 is secured to the belt at points which do not undergo any movement relative to the plane of the central portion of the belt as it changes from a troughed condition to the flat profile condition, no unnecessary forces are imposed on either the belt or the flight in undergoing direction reversal at a pulley. Securement of the flights to the belt is therefore desirably in a wire cable-reinforced region which undergoes no profile transition as the belt courses around the head, tail and any intermediate pulleys or rollers.

FIGS. 6, 11, 12 and 13 show a preferred mode of attaching the flights 20 to a belt 12 for a system in which the belt undergoes troughing. Clamping means are formed from bilaterally spaced bottom plates 77 and 79 in recesses molded into the bottom of belt 12. Spacing plates 83 and 87 coact between a flange 81 integral with the flight 20 and the belt 12. Stud bolts such as bolts 85 extend through the flange 83 and the plate 81, the belt 12, and are stud-welded to the bottom plates 77 and 79, respectively. The wire cables 75 aid in strengthening the mounting of flights 20.

FIGS. 7, 8, 9 and 10 show another form of flight and belt arrangement wherein the cross-sectional profile of the belt is substantially unchanged during movement about the head, tail and any intermediate pulleys. Thus the elevational view of the flight as shown in FIG. 7 is rectangular. In the preferred embodiments, the plan view of the flight shows a triangular or V-shaped configuration such as shown in FIG. 1.

FIG. 7 shows, therefore, a cross-section through a boom 88 which supports belt-guiding rollers such as roller 90 which in turn supports a wire cable-reinforced belt 92 to which is secured a plurality of flights, e.g. flights 94 and 96. Inasmuch as the capacity of the belt as utilized in FIGS. 7–10 is not increased by means of troughing, it is desirable in the stacking portion of the boom to provide lateral skirtboards, e.g. skirtboards 98 and 100, along the upper reach of the belt 92. The skirtboards are conveniently held in position by bracket bars 102 and 104, respectively, which are in turn secured to the frame or boom 88.

The lower marginal edges of the skirtboards 98 and 100 are conveniently provided with longitudinally extending rubber hold-downs 106 and 108, respectively, coextensive in length with the skirtboards 98 and 100. The hold-downs 106 and 108 are secured to the skirtboards 98 and 100 by longitudinally extending straps 110 and 112, respectively. Although the foregoing hold-downs 106 and 108 are the preferred structure, any suitable means for limiting the movement of the belt 92 away from the rollers 90 may be employed, these features again not forming a part of the present invention, but illustrating a desired manner of utilizing the invention.

The flight 96 is shown in position on the lower reach of the belt 92, again in coacting relation with a reclaiming chute 114. As in the endless belt structure shown in FIGS. 1–6, lateral thrust-absorbing means in the form of channels 116 and 118 are provided.

As indicated above, the flights desirably have an angular profile in the plan view as shown in FIG. 1. To minimize belt wear at the apex 120 of the two sides 122 and 124 defining the flight 94, there is provided a pad 126 secured to the flight, e.g. flight 94. A corresponding pad 128 is shown secured to and underlying the apex 130 of the flight 96. Such pads may be welded to the flight.

FIGS. 8, 9 and 10 show a convenient means for securing a flight such as flight 94 to the belt 92. The belt 92 is, as indicated above, of the wire cable-reinforced type. In this embodiment (FIG. 8), longitudinally extending marginally disposed wire cables 132, 134, 136 and 138 are provided. These cables are disposed in a marginal bead portion 140 which is displaced out of the plane of the upper surface 142 of the belt 92. Such displacement provides a recess 144 in the lower surface of the belt 92. The flight 94 is provided with a laterally extending lug 146 secured thereto by any suitable means, e.g. welding. A clamp assembly 148 indicated by the parenthesis includes an L-shaped member 150 having studs 152 and 154 welded thereto. The upwardly extending leg 156 of the L-shaped member 150 has a thickness which is desirably slightly less than the thickness of the bead portion 140 of the belt 92, whereby the clamp may be compressed slightly against the resilience of the rubber belt. Clampling plate 158 is provided for clamping coaction with the bead 140 and the L-shaped member 150. It is provided with bores 160 and 162 dimensioned to accommodate the studs 152 and 154 and enlarged recesses 164 and 166 to receive threaded nuts 168 and 170. By tightening down nuts 168 and 170 on studs 152 and 154, respectively, the bead 140 is compressed therebetween. It will be observed that the studs 152 and 154 are positioned on member 150 to extend between the wire cables 132 and 134, and 136 and 138, respectively. The reinforcing effect of the wire cables in the belt is utilized also to provide stability and a strong mounting for the clamp assembly 148. The clamping plate 158 is provided with an extending portion 172 adapted to be fastened to lug 146 as by means of bolt 174, nut 176 and lock washer 178. This assembly is provided at each of the marginal edges of the flights and serves to secure the same to the belt in a very satisfactory manner.

Moreover, the configuration of the L-shaped member 150 and the coacting clamping plate 158 is adapted to cooperate with the channels 116 and 118 to support the belt along the lower reach. It is desirable that these members be formed of hardened steel and be lubricated during use not only for sliding coaction with the channels 116 and 118, but also for the absorption of the thrust forces which are resisted by the channels 116 and 118. Since in this embodiment the belt 92 is not troughed, securement of the flights to the belt can be done at the forward and outer extremities of the flights leaving the apex (120 for example) to move relatively toward and away from the belt surface as the assembly courses around direction-changing pulleys, e.g. tail pulley 84.

There thus has been provided an endless stacker-reclaimer belt formed from an endless fabric-reinforced rubber belt having a plurality of spaced longitudinally extending reinforcing wire ropes or cables embedded therein and a plurality of generally cup-shaped rigid flights disposed at intervals along the belt and projecting outwardly therefrom. These flights are clamped to the belt by means which coact between the flights and the wire ropes in the belt to secure the flights thereto. In a preferred embodiment of the invention, stabilizing means to resist the lateral thrust forces which occur when a flight traverses a pile of stored bulk material diagonally are also provided.

What is claimed is:

1. An endless stacker-reclaimer belt comprising in combination:
   a. an endless fabric-reinforced rubber belt having a plurality of transversely spaced longitudinally extending reinforcing wire ropes embedded therein;
   b. a plurality of upstanding generally cup-shaped rigid flights disposed at intervals along said belt and projecting outwardly therefrom; and
   c. clamping means coacting at laterally spaced points between each of said flights and correspondingly spaced wire ropes in said belt to secure said flights to said belt.

2. An endless stacker-reclaimer belt in accordance with claim 1 wherein the clamping means are disposed inwardly of the marginal edges of the belt, and the belt-engaging marginal edges of each flight diverge upwardly and outwardly from said clamping means to permit troughing of the belt.

3. An endless stacker-reclaimer belt in accordance with claim 1 wherein the clamping means are disposed at the marginal edges of the belt and the belt-engaging marginal edges of each flight lie in a common plane.

4. An endless stacker-reclaimer belt in accordance with claim 1 wherein each flight includes a laterally projecting wear bar secured thereto and extending outwardly from each side thereof.

5. An endless stacker-reclaimer belt in accordance with claim 3 wherein the clamping means includes an upper clamping bar and a lower clamping bar and fastening means extensible through the belt coacting between the upper and lower clamping bars and means for attaching the upper clamping bar to the flight.

6. An endless stacker-reclaimer belt in accordance with claim 5 wherein the upper and lower clamping bars extend outwardly beyond the marginal edge of the belt on each side thereof to provide a wear bar portion.

7. An endless stacker-reclaimer belt in accordance with claim 5 wherein the fastening means includes a pair of thread-bearing studs welded to one of the clamping bars, corresponding to stud-receiving bores in the other clamping bar and nuts for said studs.

8. An endless stacker-reclaimer belt in accordance with claim 5 wherein the lower clamping bar is provided with a marginally located block, the inner face of which defines an abutment for the marginal edge of the belt, and the outer face defines a lateral wear surface.

9. An endless stacker-reclaimer belt in accordance with claim 7 wherein the lower clamping bar includes the studs welded thereto and the upper clamping bar is provided with nut-receiving recesses concentric with the stud-receiving bores.

* * * * *